United States Patent [19]
Courtright

[11] 3,800,370
[45] Apr. 2, 1974

[54] CONDUIT GRIP
[75] Inventor: Burr Courtright, La Grande, Oreg.
[73] Assignee: CH₂O, Inc., La Grande, Oreg.
[22] Filed: Jan. 19, 1973
[21] Appl. No.: 324,964

[52] U.S. Cl. .............................................. 24/260
[51] Int. Cl. ........................................... A44b 21/00
[58] Field of Search .............. 24/251, 260, 30.5 P; 248/62, 74

[56] References Cited
UNITED STATES PATENTS

| | | | |
|---|---|---|---|
| 72,776 | 12/1867 | Badger | 24/260 X |
| 269,468 | 12/1882 | Rounds | 24/260 UX |
| 1,924,353 | 8/1933 | Fitzpatrick | 248/62 |
| 3,218,011 | 11/1965 | Ammann | 248/62 |
| 3,292,221 | 12/1966 | Baugh | 24/260 X |
| 3,620,493 | 11/1971 | Huver | 24/260 X |

FOREIGN PATENTS OR APPLICATIONS
94,704  11/1962  Denmark .......................... 248/74 R Primary Examiner—Donald A. Griffin

[57] ABSTRACT

A pipe grip comprising an elongate metal strap configured to form an encompassing band integral with opposite handle halves. The handle halves are secured together by a ring which encompasses the same proximate the encompassing band portion. Raised or tapered boss portions integral with the handle halves and preferably forming portions thereof, upstand laterally from the handle halves and provide a recessed seat for the encompassing securement means. Preferably the bosses are tapered outwardly toward the encompassing band portion so that a wedging securement can be obtained.

7 Claims, 6 Drawing Figures

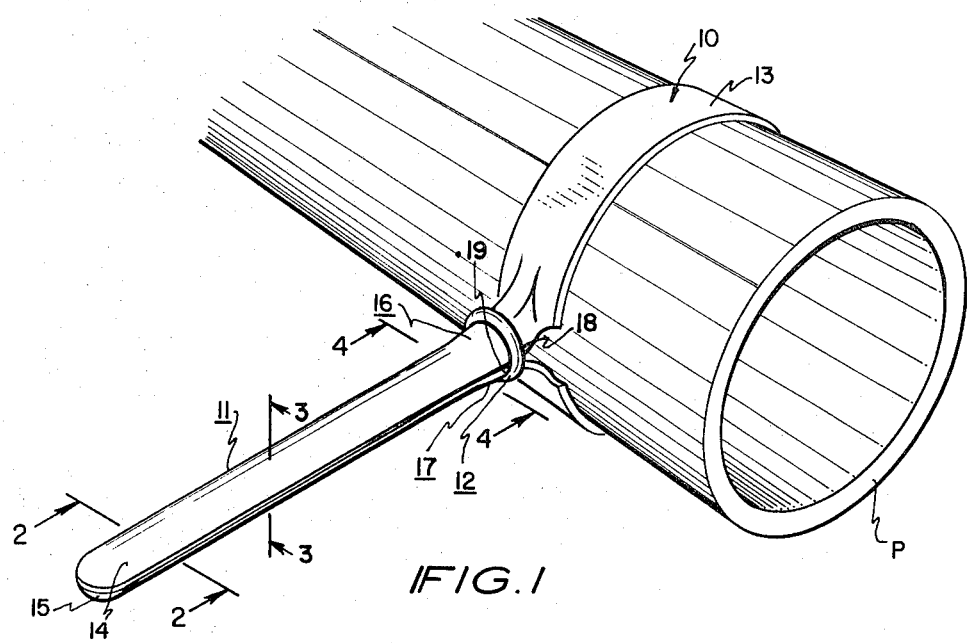
*FIG. 1*
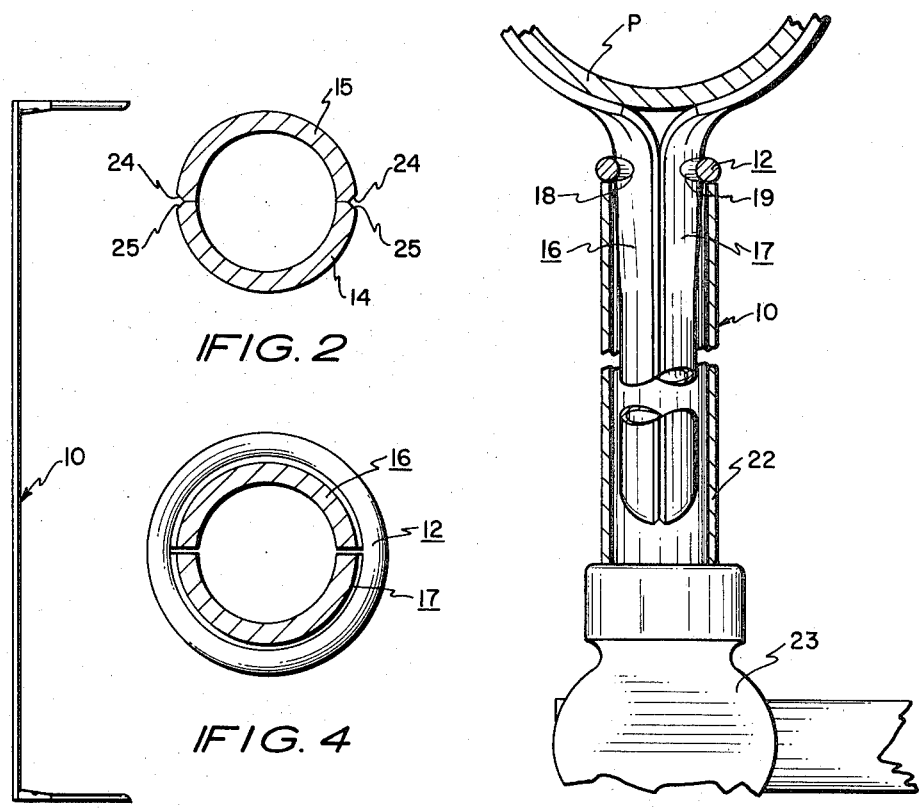
*FIG. 2*
*FIG. 4*
*FIG. 5*
*FIG. 3*
*FIG. 6*

CONDUIT GRIP

The present invention relates to means for manually or otherwise manipulating pipe, conduit, and the like and, more particularly, to a new type of pipe grip which can be fabricated simply of two pieces, namely, a formed band, having integral handle halves, and a ring constructed for encompassing and securing together said handle halves.

Prior devices in the art of which the inventor is aware have proven quite complex, expensive to make, and generally uneconomical in the agricultural pipe market, by way of example.

What is needed and what the present invention provides is a new and improved pipe grip comprising simply a formed metal strap comprising a medial band portion and a pair of opposite handle halves, the latter being secured together by a ring. In the invention and essential thereto is the provision of upstanding or outwardly tapered boss portions which are integral with the handle halves, which boss portions receive the securement ring aforementioned. Preferably, the boss portions are provided with respective ring-seat recesses such that when the ring is in place, the same grippingly secures the boss portions and handles together as well as causing the band to secure the pipe encompassed thereby.

In the construction obtained, it becomes a simple matter, once the band is formed about the pipe to be gripped, for a ring to be disposed over the handle halves and easily slipped thereover until the tapered portions thereof are reached. At this point, alignment of the ring with the boss portions is achieved while an external pipe is slipped over the handle halves, now in relative proximity. The user then can simply urge, as by a hammer and a series of percussive blows, the ring forwardly so as to grippingly secure the boss portions and hence the handle halves together. Such securement effects not only a final mutual placement of the handle halves but also, and correspondingly, a gripping action of the medial band portion of the grip relative to the pipe over which it has been implaced.

Accordingly, a principal object of the present invention is to provide a new and improved gripping device for conduit, pipe and the like.

An additional object is to provide a pipe grip which can be made simply of a unitary formed member in combination with a ring.

An additional object is to provide an improved pipe grip wherein opposite handle halves are provided with upstanding or raised portions or bosses proximate the medial band portion of the device, such raised portions accommodating a securement ring placed thereover.

An additional object is to provide an improved pipe grip wherein the ring securement mounting means thereof is provided with outwardly tapered surfaces configured such that the securement ring for the grip can be implaced not only to draw the handle halves of the device together but also to effect a shrinkage of the circumference of the band portion of the device, so as to obtain a gripping action thereof relative to the pipe or other conduit contained thereby.

The features of the present invention may best be understood by reference to the following description taken in connection with the accompanying drawings in which:

FIG. 1 is a perspective view of the device of the present invention when utilized over a pipe or conduit in the manner desired.

FIG. 2 is a cross-section taken along the line 2—2 in FIG. 1.

FIG. 3 is an enlarged, fragmentary, longitudinal section, taken along the line 3—3 in FIG. 1 and rotated 90°, illustrating the manner in which the ring is implaced upon the formed strap of the device when configured over a pipe to be gripped; illustrated is the use of a hammer and external pipe section for securing the ring in place.

FIG. 4 is an enlarged section taken along the line 4—4 in FIG. 1.

FIGS. 5 and 6 are edge views of the device of FIG. 1 as the same may be stamped and formed preparatory to use.

In the drawings the pipe grip device 10 is shown to include a pipe grip member 11 and a ring 12, preferably of round elemental cross-section as shown. The pipe grip member 11 is preferably formed from an elongate piece of strap metal such as mild steel, by way of example. Pipe grip member 11 comprises a central band portion 13, a pair of hemi-cylindrical handle halves 14 and 15 having closed ends, and a pair of intermediate boss portions 16 and 17. Boss or tapered portions 16 and 17 are raised with respect to the remainder of handle halves 14 and 15.

Boss, tapered, or enlarged portions 16 and 17 each include cylindrical grooves or recesses 18 and 19 to seat ring 12. Accordingly, and as seen in FIG. 3, when an exterior tube or pipe 22 is hit as by a hammer 23 to advance ring 12 forwardly, the latter will slide up the tapered portions 16 and 17 to seat into grooves.

FIG. 2 illustrates that each of the handle halves may have opposite side chamfered edges as at 24 and 25. Such chamfered edges will preclude the chance of pinching the skin of the hand of the user.

In essence, the present invention provides an easily formed pipe grip whereby, by use of a single strap of metal of preferably uniform width and thickness, the end extremities thereof may be formed as to comprise the handle halves and boss halves, leaving the medial portion flat to comprise band portion 13. Where the pipe grip is made of aluminum or mild steel, by way of example, the pipe grip is easily formed over a pipe or conduit to be engaged, see pipe P in FIG. 1. Thus, as the handles are brought closer together a ring 12 is placed thereover and is advanced forwardly as illustrated in FIG. 3, as above explained, such that the ring wedgingly retains the raised bosses of the device together so that a gripping action is had as between band portion 13 and pipe P.

FIG. 4 illustrates that the bosses 16 and 17 are contained within the ring 12 in the manner illustrated. Slight spacing may exist as between the boss halves, owing to the forming of the boss relative to the respective handle halves.

FIGS. 5 and 6 illustrate blanks that can be formed to include the handle halves wherein the same are disposed 90 degrees from the general orientation of the band portion to be formed around the pipe to be gripped. Of course, the formed or stamped and formed device may be supplied to the consumer in flat pattern layout.

What is provided, hence, is a new and improved low-cost pipe grip which can be formed from a single piece of strap metal, the same simply being supplied with a securement ring.

While particular embodiments of the invention have been shown and described, it will be obvious to those skilled in the art that various changes and modifications which may be made without departing from the essential features of the present invention and, therefore, the aim in the appended claims is to cover all such changes and modifications as fall within the true spirit and scope of the invention.

I claim:

1. A conduit grip including, in combination, an elongate metal strap having handle halves at opposite extremities and a medial band portion constructed for positionment about conduit to be gripped by said grip, said strap including inclined, camming, raised portions between said handle portions and said band portion, said raised portions including mutually aligned transverse peripheral grooves, and a ring slipped over said handle portions and seated over said raised portions in said peripheral grooves and constructed for securing said handle halves together and for forming said medial band portion in gripping engagement with a conduit to be grippingly encompassed thereby.

2. Structure according to claim 1 wherein said metal strap as a blank has a transverse, thin, essentially rectangular cross-section, said handle halves each comprising hemi-cylindrical, semi-tubular, elongate portions.

3. Structure according to claim 1 wherein said handle halves include opposite, elongate chamfered outer edges.

4. Structure according to claim 1 wherein said raised portions are tapered outwardly toward said medial band portion, said ring retentively engaging said raised portions.

5. A pipe grip comprising an elongate metal strap and a securement ring, said metal strap comprising a pair of handle halves and a medial, pipe-encompassing band portion disposed intermediate of and contiguous with said handle halves at respective juncture, inclined, raised, camming portions proximate the junctures of said handle halves with said medial band and having mutually aligned recessed seats, said ring being positioned over said raised portions in said seats to secure said handle halves together.

6. Structure according to claim 5 wherein said raised portions are tapered outwardly toward said medical band portion proximate the juncture therewith.

7. Structure according to claim 5 wherein there is included percussion-blow-receiving tubular tool means encompassing said handle halves and extending rearwardly therebeyond, for impact-engaging and seating said ring.

* * * * *